United States Patent [19]

Morris

[11] 4,031,169

[45] June 21, 1977

[54] THERMOPLASTIC ELASTOMERIC POLYMER BLEND

[75] Inventor: Harris L. Morris, Woodbridge, Conn.

[73] Assignee: Uniroyal Inc., New York, N.Y.

[22] Filed: Sept. 11, 1975

[21] Appl. No.: 612,419

[52] U.S. Cl. .......................................... 260/897 A
[51] Int. Cl.$^2$ ........................................ C08L 23/16
[58] Field of Search ................................ 260/897 A

[56] References Cited

UNITED STATES PATENTS

| | | | |
|---|---|---|---|
| 3,806,558 | 4/1974 | Fischer | 260/897 A |
| 3,835,201 | 9/1974 | Fischer | 260/897 A |
| 3,851,411 | 12/1974 | Crosbie et al. | 36/68 |
| 3,904,470 | 9/1975 | Fukuki et al. | 156/306 |
| 3,919,358 | 11/1975 | Batiuk et al. | 260/897 A |

*Primary Examiner*—Carman J. Seccuro
*Attorney, Agent, or Firm*—James J. Long

[57] ABSTRACT

A thermoplastic, elastomeric and reprocessable polymer blend comprising:

A. 30 to 90 parts by weight of a terpolymer of ethylene, a different monoolefin, and dicyclopentadiene, the weight ratio of ethylene to different monoolefin being from 70/30 to 85/15, said terpolymer having a zero shear viscosity of not greater than 0.5 to $10^9$ poises; and B. correspondingly 70 to 10 parts by weight of a polyolefin resin.

15 Claims, No Drawings

THERMOPLASTIC ELASTOMERIC POLYMER BLEND

This invention relates to a thermoplastic elastomeric composition.

Thermoplastic elastomers, also called elastoplastics, are materials which have elastomeric properties without requiring cure. They can be fabricated by rapid, economical methods usually employed in making thermoplastic articles. Because they are repeatedly reprocessable, scrap or defective articles can be recycled. Unlike an ordinary vulcanizable elastomer which does not develop elastomeric properties until it is cured, no curing step or long dwell time in a mold is necessary with thermoplastic elastomers. Because of the great advantages of thermoplastic elastomers the art is constantly searching for new and improved materials of this kind which could be made more easily or more economically, or which would give superior results.

The present invention is based on the discovery that a thermoplastic elastomer having certain improved properties can be provided conveniently and economically by blending:

A. a terpolymer of (i) ethylene, (ii) an alphamonoolefin having the structure $CH_2=CH-R$ wherein R is an alkyl radical having from 1 to 12 carbon atoms, the ratio of ethylene to alpha-monoolefin being from 70/30 to 85/15 by weight, and (iii) dicyclopentadiene, with B. a polyolefin resin. This thermoplastic elastomer is characterized by improved tensile strength and elongation and lower elongation set, compared to certain prior art thermoplastic elastomers which will be discussed below.

U.S. Pat. No. 3,758,643, Fischer, Sept. 11, 1973, discloses a thermoplastic elastomer which is a blend of a partially cured monoolefin copolymer rubber (such as EPM [saturated ethylene-propylene copolymer rubber] or EPDM [unsaturated ethylene-propylene-non-conjugated diene terpolymer rubber]) with a polyolefin plastic (such as polypropylene). The necessity for partial cure of the rubber in accordance with the teachings of this patent adds to the inconvenience and expense of preparing the thermoplastic elastomer. In the present invention, no partial cure of the rubber is required. This Fischer patent exemplifies the use of two different EPDM's. One of the EPDM's uses ENB (5-ethylidene-2-norborene as the non-conjugated diene. Such an EPDM is inoperative in the present invention which uses EPDM based on DCPD (dicyclopentadiene) as the non-conjugated diene. The other EPDM exemplified in the foregoing Fischer patent is a DCPD type, but contains ethylene and propylene in 50:50 weight ratio, whereas the present invention requires an ethylene to propylene weight ratio of at least 70:30 in the EPDM.

U.S. Pat. No. 3,806,558, Fischer, Apr. 23, 1974, discloses a thermoplastic elastomer made by partially curing a blend of EPM or EPDM with a polyolefin resin while masticating and shearing in the presence of a curative. The present invention dispenses with the necessity for such a dynamic partial curing step. This Fischer patent states that the ethylene:propylene ratio in the EPDM is frequently from 80:20 to 20:80. However, the two EPDM's exemplified in this Fischer patent have lower ethylene:propylene ratios (50:50 in the case of the DCPD type EPDM; 63.5:36.5 in the case of the ENB type which would be inoperative in the present invention purely aside from the low ethylene content) than are employed in the present invention.

U.S. Pat. No. 3,835,201, Fischer, Sept. 10, 1974, discloses a thermoplastic elastomer which is an EPDM rubber-polyolefin resin blend, wherein the EPDM rubber is of a special kind having a high zero shear viscosity (at least $1 \times 10^9$ poises, determined from shear creep data at 135° C) and high intrinsic viscosity. The present invention eliminates the necessity for employing an EPDM having such high molecular weight, which is not always desirable because of its tough and intractable characteristics (col.5,1. 11 – 19), and instead employs more readily prepared EPDM having a zero shear viscosity not greater than $0.5 \times 10^9$, usually not exceeding $0.3 \times 10^9$ poises, and an intrinsic viscosity (in tetralin at 135° C) of less than 2.6, usually less than 2.0 dl/g.

Blends EPDM (exemplified by an ethylene — propylene — dicyclopentadiene terpolymer in which the E/P ratio is 50:50) with polyolefin plastic are disclosed in U.S. Pat. No. 3,851,411, Crosbie et al., Dec. 3, 1974.

The invention is accordingly directed to a thermoplastic, elastomeric and reprocessable polymer blend comprising A. 30 to 90 parts by weight of a terpolymer of ethylene, an alpha-monoolefin having the structure $CH_2=CH-R$, wherein R is an alkyl radical having from 1 to 12 carbon atoms (e.g., propylene, butene-1, hexene-1, etc.), the weight ratio of ethylene to alpha-monoolefin being from 70/30 to 85/15 by weight, and dicyclopentadiene, with B. correspondingly 70 to 10 parts by weight of a polyolefin resin.

Preferably the ratio of (A) EPDM type terpolymer rubber to (B) polyolefin plastic has a range of 45/55 to 90/10; the ethylene: alpha-monoolefin ratio in (A) is preferably from 70/30 to 82/18, and the DCPD (dicyclopentadiene) content in (A) is preferably from 5 to 20%, by weight. Most preferably the ratio of the terpolymer rubber (A) to polyolefin resin (B) is within the range of from 60/40 to 90/10, while the ratio of ethylene to alpha-monoolefin is within the range from 74/26 to 80/20, and the DCPD content of (A) is most preferably from 7.5 to 15%, by weight.

As indicated above, the terpolymer rubber (A) employed in the invention has a zero shear viscosity not greater than $0.5 \times 10^9$, usually not exceeding $0.3 \times 10^9$ poises (determined from zero shear creep data at 135° C), and an intrinsic viscosity of less than 2.6, usually less than 2.0 dl/g (measured in tetralin at 135° C.) This rubbery polymer has no gel in boiling xylene and the gel content in cyclohexane at room temperature is not greater than 18%, preferably not greater than 16% by weight.

The polyolefin resin (B) with which the terpolymer rubber (A) is mixed to make the blend of the invention is a solid, high molecular weight resinous plastic material made by polymerizing such olefins as ethylene, propylene, butene-1, pentene-1, 4-methylpentene, etc., in conventional manner. Thus, such essentially crystalline polyolefins as polyethylene (either of the low density [e.g., 0.910 –0.925 g/cc], medium density [e.g., 0.926 – 0.940 g/cc] or high density [e.g., .941 – 0.965 g/cc]) may be used, whether prepared by high pressure processes or low pressure processes, inclusing linear polypropylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 may be mentioned particularly. Crystalline block copolymers of ethylene and propylene (which are plastics distinguished from amporphous, random ethylene-propylene elastomers) can also be used. Included among the polyolefin resins are the higher alpha-olefin modified polyethylenes and polypropylenes (see "Polyolefins", N. V. Boenig, Elsevier Publishing Co., N. Y., 1966).

The basis of this invention resides in the fact that blends of ethylene-alpha-monoolefin-dicyclopentadiene rubber with polyolefin (e.g., polypropylene) resin retain remarkably low elongation set values at high ethylene contents (E/P ratio 70/30 or higher), whereas blends based on terpolymers containing other termonomers (e.g., ENB [5-ethylidene-2-norbornene], 1,4-hexadiene) exhibit a sudden undesirable rise in set at about the above E/P ratio. Elongation set is, of course, a measure that indicates the ability of a material to recover its original shape after stretching. The higher ethylene content (or E/P ratio) in the EPDM seems to contribute towards higher tensile strength in the blends.

To prepare the blend of the invention the polymers are simply mixed together at normal mixing temperature, either in an internal mixer such as a Banbury (trademark), Braebender (trademark,) or extruder mixer, or in an open mixer such as a roll mill. The blended composition may include if desired additional conventional materials such as pigments, fillers, processing aids, stabilizers, antioxidants, etc. in accordance with common practice in preparing thermoplastic compositions. Of course, no curing agent (crosslinking agent, or vulcanizing agent) is included in the compositions which are true thermoplastics as distinguished from vulcanizing or curing compositions that become thermoset in the course of the shaping operation. Of course, no partial or semi-cure is involved, either before or during the blending, or in the final shaping of the blend.

The blends of the invention may be used to produce thermo-formed shaped objects (e.g., by extrusion, injection or compression molding, blow molding, calendering, vacuum forming) including insulation on wire, gaskets, flexible tubing, weatherstripping, automotive body parts such as bumpers, etc., by conventional thermoplastic shaping techniques. Unlike thermosetting compositions, such as the usual vulcanizable elastomers, no prolonged dwell time for a curing step is necessary and therefore rapid and economical production of shaped elastomeric articles is possible. Unlike a vulcanized elastomer the present material remains thermoplastic even after the shaping step and is repeatedly reprocessable, thereby eliminating waste (non-reprocessable cured scrap) and making it possible to recycle the material repeatedly. The physical properties are surprisingly similar to those of a vulcanized elastomer, in spite of the absence of any vulcanizing step such as is necessary in a conventional rubber to develop elastomeric properties.

The blends of the invention, based on dicyclopentadiene type of ethylene-alpha-monoolefin terpolymer rubber in which the ratio of ethylene to alpha-monoolefin is high, have an important advantage in that they tend to retain their good tensile strength at high temperatures to a larger extent than comparable blends employing terpolymers based on other copolymerizable polyenes. Prior thermoplastic rubber blends based on EPDM's having high ethylene content have utilized ENB type or 1,4-heaxdiene type of EPDM. Such blends have high elongation set at break in comparison to the blends of the invention based of dicyclopentadiene type of EPDM.

The invention thus makes possible the attainment, in an economical and convenient manner, of a desirable combination of physical properties, notably high ultimate tensile strength (at least 1000 psi), along with high elongation at break (at least 100%) and low elongation set at break (not greater than 50%).

EXAMPLE I

This example, as summarized in Table I, involves four separate runs or series, designated 1 to 4, each embodying a range of blend ratios designated A, B and C. Only the Run 1 series, which involves an ethylene-propylene-dicyclopentadiene terpolymer having a high ethylene to propylene ratio, is within the scope of the invention; the other runs are included merely for purposes of comparison.

In the first part of Table I, the four terpolymer rubbers employed (EPDM's) are characterized with respect to their ethylene propylene ratio (E/P), dicyclopentadiene (DCPD) or 5-ethylidene-2-norbornene (ENB) content, Mooney viscosity (ML-4 at 100° C.), zero shear viscosity (ZSV, poises, measured at 135° C. using a shear creep viscometer as described in U.S. Pat. No. 3,835,201 referred to above, col. 7, 1. 60 — col. 8, 1. 39), intrinsic viscosity (I.V., dl/g, in tetralin at 135° C), and gel (% by weight, in cyclohexane at room temperature).

The polypropylene resin (PP) employed is an isotactic and largely crystalline material having a melt flow index of 4 (ASTM D1238-57T, 230° C.), a density of 0.903 and a gel content of 96% by weight (cyclohexane, 48 hrs. at 73° F.), known as Profax 6523 (trademark).

As shown in Table I, each run involves 3 different EPDM/PP ratios, starting at 30/70 (by weight) and increasing in EPDM content to 75/25.

To prepare a mix, the EPDM rubber and polypropylene are initially charged to a neutral laboratory Banbury mixer (No. 11). The Banbury is run at No. 2 speed until the temperatures reaches 350° F. After the batch is mixed at this temperature for 5 minutes, 1.25 phr (parts per 100 parts by weight of polymers) of stabilizers, made up of 0.2 phr magnesium oxide (Maglite D, trademark) 0.3 phr tetrakis[methylene(3,5-di-tert-butyl-4-hydroxyhydrocinnamate)] methane (Irganoz 1010, trademark), 0.5 phr dilaurylthiodipropionate, and 0.25 phr 2-(3′,5′-di-tert-butyl-2′-hydroxyphenyl)-5-chlorobenzotriazole (u.v. absorber, Tinuvin 327, trademark), are added. The batch is mixed for another 2 minutes before it is dropped onto a hot mill (300° F. roll temperature). The milled sheet is then chopped up into pellets.

Under blend properties as listed in Table I are "tensile", meaning the ultimate tensile strength of the blend, the "elongation" which refers to the elongation at break, and the "elongation set" which means the elongation set at break (U.S. Pat. No. 3,835,201 referred to above, col. 7, 1. 18–82).

To determine the properties, test specimens are injection molded in a Negri Bossi (trademark) screw injection molding machine (Model V.17-110 F.A., capacity 5.5 oz.). The temperature profile used is a rear barrel temperature of 375° F., a front barrel temperature of 420° F., a nozzle temperature of 420° F., and a mold temperature of 125° F. The total cycle time is 30 seconds; the injection time is 10 seconds, the holding time is 20 seconds. The screw back pressure is 200 psi, the screw speed is 80 rpm, and the injection speed setting is 40% of maximum. The injection pressure used is 100 psi over the minimum fill pressure. The cavity of the mold is 2 × 6 × .075 inches with an edge gate.

Inspection of the results as shown in Table I reveals that the invention as represented by the Run I blends involving DCPD type EPDM of high E/P ratio (75/25), provides an outstanding combination of properties, particularly high tensile strength and low elongation dienes, namely, DCPD, ENB, and 1,4-hexadiene (1,4-HD). Runs 5 and 6 in Table II use high ethylene DCPD type of EPDM and are within the scope of the invention; these blends embody good tensile and low set. Runs 7 and 8 employ DCPD type EPDM, but at low E/P ratios (below 70/30); they have inferior tensile strength and are outside the invention. The runs using ENB type terpolymer rubber (Runs 9 to 13, outside the invention) have very high set, unless the E/P ratio is reduced, in which case an undesirable reduction of the tensile strength is apparent. The 1,4-HD type EPDM, used in Run 14, produces high set and is likewise outside the invention.

TABLE II

| RUN NO. | 5 | 6 | 7 | 8 | 9 | 10 | 11 | 12 | 13 | 14 |
|---|---|---|---|---|---|---|---|---|---|---|
| EPDM | | | | | | | | | | |
| E/P (Wt) | 75/25 | 74/26 | 69/31 | 65/35 | 79/21 | 77/23 | 75/25 | 74/26 | 67/33 | 76/24 |
| DCPD, % (Wt) | 8 | 7.5 | 5.5 | 4.5 | — | — | — | — | — | — |
| ENB, % (Wt) | — | — | — | — | 7 | 9 | 8 | 7 | 4.5 | — |
| 1,4-HD % (Wt) | — | — | — | — | — | — | — | — | — | 7 |
| ML-4 at 100° C | 63 | 60 | 42 | 37 | 75 | 80 | 65 | 110 | 75 | 52 |
| ZSV | $2.6 \times 10^8$ | $2.5 \times 10^8$ | — | $5.7 \times 10^7$ | $2 \times 10^8$ | $1.27 \times 10^8$ | — | — | — | — |
| IV | 1.8 | 1.9 | 1.7 | 1.7 | 2.0 | 2.2 | 2.2 | 2.2 | 2.0 | 1.3 |
| Gel. | 15 | 15 | 10 | 10 | 14 | 0 | 6 | 14 | 5 | — |
| BLEND PROPERTIES | | | | | | | | | | |
| Tensile, psi | 1170 | 1090 | 900 | 880 | 1690 | 1450 | 1350 | 1190 | 830 | 1150 |
| Elongation, % | 110 | 130 | 130 | 150 | 420 | 340 | 380 | 290 | 150 | 210 |
| Elongation set, % | 20 | 25 | 30 | 30 | 185 | 120 | 125 | 75 | 25 | 210 | set. Run 3 also involves a DCPD polymer, but the E/P ratio is low (65/35); these blends trend towards lower tensile strength and/or higher elongation set and are outside the invention. Run 2 uses a high E/P ratio (79/21) EPDM, but the diene is ENB rather than DCPD; these blends achieve high tensile strength, but the elongation set is very high, making these blends inferior to the blends of the invention in this respect. Run 4, using a high zero shear viscosity DCPD terpolymer of low E/P ratio (63/37), demonstrates that such an EPDM gives good tensile strength in the blends, but the elongation set runs consistently higher than the invention blends, at the various blend ratios.

TABLE I

| RUN NO. | EPDM/PP BLENDS | | | |
|---|---|---|---|---|
| | 1 | 2 | 3 | 4 |
| EPDM | | | | |
| E/P, (Wt) | 75/25 | 79/21 | 65/35 | 63/37 |
| DCPD, % (Wt) | 8 | — | 4.5 | 4 |
| ENB, % (Wt) | — | 7 | — | — |
| ML-4 at 100° C | 63 | 75 | 37 | — |
| ZSV | $2.6 \times 10^8$ | $2.0 \times 10^8$ | $5.7 \times 10^7$ | $3.0 \times 10^9$ |
| I.V. | 1.8 | 2.0 | 1.7 | ca. 3 |
| Gel, % | 15 | 14 | 10 | ca. 15 |
| BLEND PROPERTIES | | | | |
| A. EPDM/PP=30/70 | | | | |
| Tensile, psi | 3300 | 3920 | 3280 | 3200 |
| Elongation, % | 105 | 70 | 50 | 210 |
| Elongation set, % | 35 | 55 | 25 | 70 |
| B. EPDM/PP=45/55 | | | | |
| Tensile, psi | 2640 | 3020 | 2690 | 2680 |
| Elongation, % | | 150 | 120 | 250 |
| Elongation set, % | 20 | 105 | 70 | 90 |
| C. EPDM/PP=75/25 | | | | |
| Tensile, psi | 1400 | 1680 | 1120 | 1540 |
| Elongation, % | 120 | 400 | 130 | |
| Elongation set, % | 30 | 180 | 40 | 40 |

EXAMPLE II

The procedure of Example I is employed to make a series of blends of various EPDM's and the same polypropylene as used in Example I, at an EPDM/PP weight ratio of 80/20, with the results shown in Table II. The EPDM's used vary in E/P ratio and use three different

I claim:
1. A thermoplastic, elastomeric and reprocessable polymer blend comprising
  A. 30 to 90 parts by weight of a terpolymer rubber of (i) ethylene, (ii) an alpha-monoolefin having the structure $CH_2=CH—R$ wherein R is an alkyl radical having from 1 to 12 carbon atoms, the ratio of ethylene to alpha-monoolefin being from 70/30 to 85/15 by weight, and (iii) dicyclopentadiene, and
  B. correspondingly 70 to 10 parts by weight of a polyolefin resin,
the said terpolymer (A) having a zero shear viscosity not greater than $0.5 \times 10^9$ poises at 135° C, and the said blend having an ultimate tensile strength of at least 1000 psi, an elongation at break of at least 100%, and an elongation set at break not greater than 50%.
2. A blend as in claim 1 in which (ii) is propylene.
3. A blend as in claim 1 in which (B) is polypropylene.
4. A blend as in claim 1 in which the said zero shear viscosity is not greater than $0.3 \times 10^9$ poises.
5. A blend as in claim 1 in which (A) has an intrinsic viscosity of less than 2.6 dl/g in tetralin at 135° C.
6. A blend as in claim 5 in which the said intrinsic viscosity is less than 2.0 dl/g.
7. A blend as in claim 1 in which (A) has no gel in boiling xylene
8. A blend as in claim 1 in which (A) has a gel content not greater than 18% by weight in cyclohexane at room temperature.
9. A blend as in claim 8 in which the said gel content in cyclohexane is not greater than 16% by weight.
10. A blend as in claim 1 devoid of curatives.
11. A uncured blend as in claim 1.
12. A blend as in claim 1 in which the ratio of (A) to (B) is within the range of from 45/55 to 90/10 by weight, the ethylene/alpha-monoolefin ratio in (A) is from 70/30 to 82/18 by weight and the dicyclopentadiene content of (A) is from 5 to 20% by weight.

13. A blend as in calim 1 in which the ratio of (A) to (B) is within the range of from 60/40 to 90/10 by weight, the ethylene/alpha-monoolefin ratio in (A) is from 74/26 to 80/20 by weight, and the dicylopentadiene content of (A) is from 7.5 to 15% by weight.

14. A thermoplastic, elastomeric, uncured, reprocessable polymer blend devoid of curatives comprising
  A. 45 to 90 parts by weight of an elastomeric terpolymer of ethylene, propylene and dicyclopentadiene, the ratio of ethylene to propylene being from 70/30 to 82/18 by weight, and the dicyclopentadiene content of the terpolymer being from 5 to 20% by weight, the said terpolymer having a zero shear viscosity not greater than $0.3 \times 10^9$ poises at 135° C., an intrinsic viscosity of less than 2.0 dl/g in tetralin at 135° C., and a gel content not greater than 16% by weight in cyclohexane at room temperature, and
  B. correspondingly 55 to 10 parts by weight of polypropylene resin.

15. A method of making a shaped article comprising providing a blend as in claim 1 and thereafter shaping the blend into a desired shape by a thermoplastic shaping method without any cure.

* * * * *